United States Patent [19]
Austefjord

[11] 3,943,279
[45] Mar. 9, 1976

[54] DIGITAL CONVERGENCE OF MULTIPLE IMAGE PROJECTORS

[75] Inventor: Harald M. Austefjord, San Jose, Calif.

[73] Assignee: Aeronutronic Ford Corporation, Blue Bell, Pa.

[22] Filed: Sept. 23, 1974

[21] Appl. No.: 508,279

[52] U.S. Cl............. 178/7.3 D; 178/7.5 D; 178/6.5; 178/7.7; 358/60; 315/368
[51] Int. Cl.²... H04N 5/74; H04N 9/28; H04N 9/58
[58] Field of Search............ 358/51, 60, 56, 61, 64; 178/6.5, 7.6, 7.7, DIG. 22, 7.3 D, 7.5 D; 315/370, 371, 367, 368

[56] References Cited
UNITED STATES PATENTS

| | | | |
|---|---|---|---|
| 2,654,854 | 10/1953 | Seright | 315/370 |
| 2,989,584 | 6/1961 | Mengle | 358/60 |
| 3,115,544 | 12/1963 | Marley | 358/60 |
| 3,648,097 | 3/1972 | Merryman | 315/367 |
| 3,714,496 | 1/1973 | Horvath | 315/367 |
| 3,740,608 | 6/1973 | Manber et al. | 315/370 |

*Primary Examiner*—Robert L. Richardson
*Attorney, Agent, or Firm*—Robert D. Sanborn

[57] ABSTRACT

In a scanned multiple image display device a plurality of individual projectors produces a single composite image by optically combining individual projector outputs. The individual images must be converged with each other to produce an acceptable display. A digital computer is used to generate and store words that correspond to the required convergence correction for individual projectors. The stored words are read out of the computer in accordance with projector scanning timing and, after being converted to analog form, are used to correct the scanning to produce convergence.

3 Claims, 3 Drawing Figures

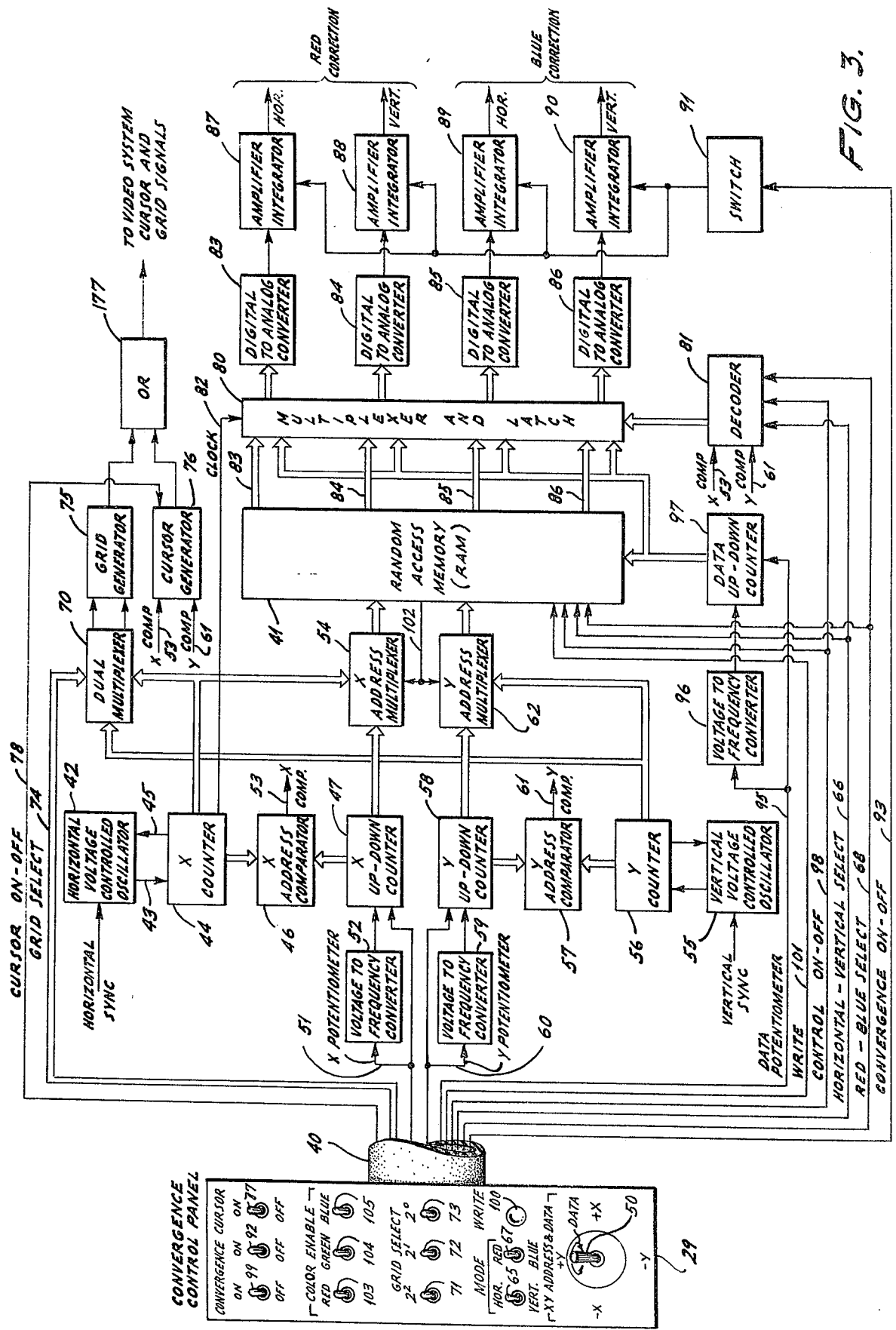

DIGITAL CONVERGENCE OF MULTIPLE IMAGE PROJECTORS

BACKGROUND OF THE INVENTION

It is often useful to combine a plurality of optical image projectors to produce a composite image. Such a combination might be useful where an image brighter than the capabilities of a single projector is desired. A color image may be produced using three primary color projectors. A two projector system might be used to produce a stereo picture display. In any of these applications it is important that each projector be made to project an image that is in registry with the images of all of the other projectors in the display.

In scanning type projectors it is customary to modulate the image deflection signals with signals called convergence signals. In a scanner the deflection signals are usually arranged to provide as linear an image as possible. Then an analog correction signal is added to the scanning signal. This analog signal is shaped in a so-called convergence procedure so that the projectors produce convergent pictures. Typically the prior art convergence signals were such that adjusting convergence at one part of the picture would affect convergence in another part so that the convergence process included a very time consuming repetitive adjustment or tuning sequence.

Desirably convergence would be such that once an area of a picture is converged it need not be touched again as other areas are converged. Thus the convergence process needs to be performed only once and the initial adjustment can be made highly precise.

SUMMARY OF THE INVENTION

It is an object of the invention to use a digital computer to generate and control the convergence signals used to correct the scanning in an optical display device.

It is a further object to use digital techniques to generate, store, and produce the analog convergence signals used in a multiple element image display scanning projector.

It is a feature of the invention that multiple source scanning raster projectors can be precisely converged wherein the various raster areas can be converged independently of all other raster areas.

It is a further feature that multiple scanning rasters can be converged by a series of adjustments that need not be repeated.

These and other objects and features are achieved in a system operating as follows: A plurality of scanning projectors, for example one each for red, green, and blue produce images that impinge on a screen to produce a full color display. Convergence signals are applied to the scanning circuits so that all three rasters are made to coincide at all points. This is done by correcting two of the projectors to coincide with the third. This convergence is achieved using a digital computer. The raster is divided into a relative large number of small areas each one of which can be converged indepently of all of the others. The computer employs a memory large enough to stroe a digital word for each projector to be corrected for each convergence area for vertical and horizontal scanning. In one example the raster is divided into 16 vertical and 16 horizontal regions, or 256 areas. 8-bit words are used to indicate the convergence correction for both horizontal and vertical deflection in convergence correction for both horizontal and vertical deflection in two projectors. This requires a memory capacity of 256 × 8 × 4 or 8192 bits. The memory is addressed in synchronism with the projector scanning and a digitally generated cursor is applied to the projectors to indicate which of the 256 areas is in operation. When a suitable scanning correction is found for a particular raster area the information in the form of four 8-bit words is written into the memory. One word applies to each of the two projectors and each uses a separate word for vertical and horizontal correction. This is done for each of the areas of raster desired. Once the memory is programmed, it can be used to read, in synchronism with the scanning, the stored correction signals. The digital stored words, after readout, are converted to analog voltages to be applied to the projector scanning cirsuits.

From the above it is clear that the correction system can be used to either conform a scanning raster to an arbitrary form or to another raster as desired. The corrections are mutually independent so that the sequence of adjustments need be repeated only once.

BRIEF DESCRIPTION OF THE DRAWINGS

FIG. 3 is a detailed block diagram of the digital and control portions of the system of FIG. 2.

DESCRIPTION OF THE INVENTION

Figure 1:
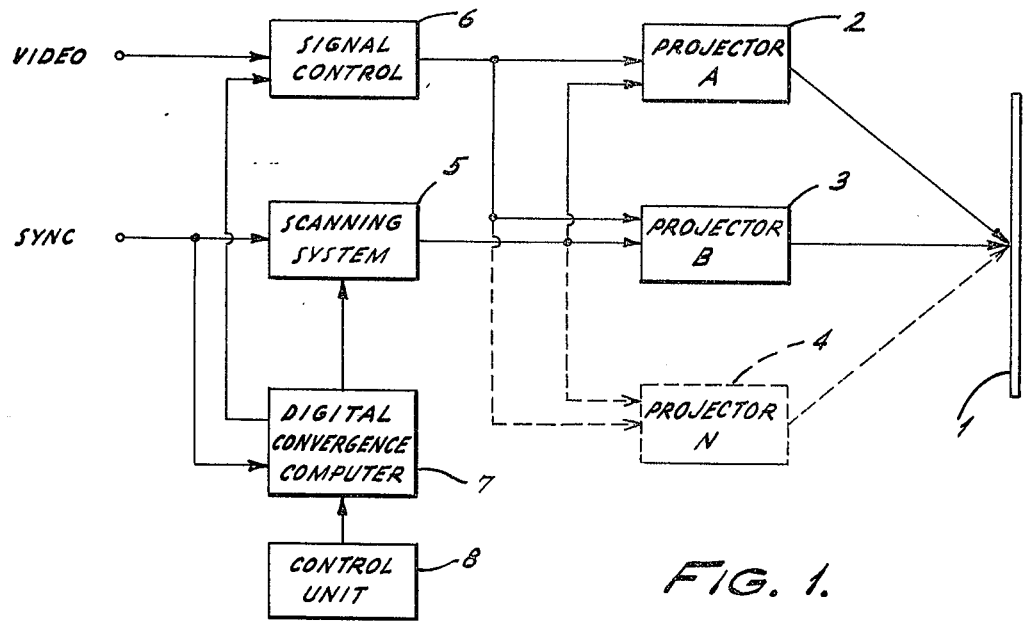
FIG. 1 is a block diagram of a multiple scanning projector system using a built-in digital computer for convergence control.

FIG. 1 shows the basic elements of the invention. A display screen 1, receives projected images from at least projectors 2 and 3. As shown in dashed outline at 4, any number of additional projectors could be included. The projectors could all be projecting the same image so as to obtain a suitably bright display. Alternatively projectors 2 and 3 could be projecting a stereo pair of images for three dimensional (3-D) viewing. Three projectors could be used to produce the primary colors for a full color display. Six projectors could be used for a high brightness full color display.

The projectors are scanned by a common scanning system 5 and are fed suitable video signals from signal control 6. Each projector will project a scanning raster onto screen 1, and desirably, the rasters will exactly coincide at all points thereon. In practice it will be difficult if not impossible to manufacture projectors to such close tolerances that the rasters will in fact coincide. Accordingly the scanning system is provided with scanning correction signals from a digital convergence computer 7 that is synchronized to the raster scanning signals. The computer also provides video signals that can be used in the acutal convergence process. A control unit 8 operates the computer and controls it to provide the required functions. First the computer is programmed to store, in digital form, the signals required to produce scanning raster convergence. Then the computer is used to read out the required signals for raster correction. The digital computer read out is converted to analog signals which, when added to the scanning signals, will produce coincident projected rasters.

DESCRIPTION OF THE PREFERRED EMBODIMENT OF THE INVENTION

Figure 2:
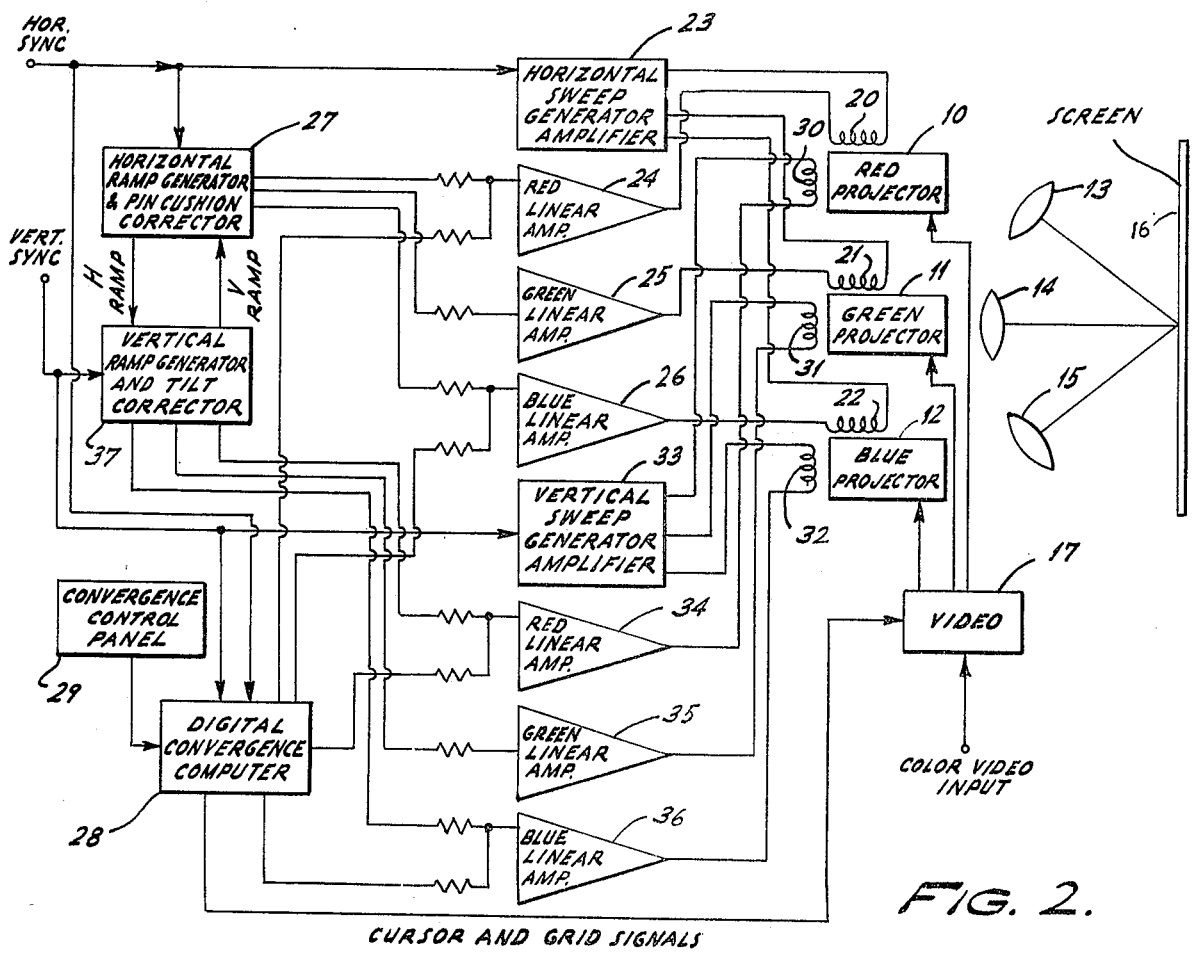
FIG. 2 is a block diagram of a full color display system.

FIG. 2 is a block diagram of a color projection system. Three projectors 10, 11, and 12 develop red, green, and blue rasters respectively. These are projected by lenses 13, 14, and 15 onto screen 16. If the projectors are adjusted so that the rasters are all properly registered and contribute the proper excitation, a full color picture can be obtained. While not shown, each projector would also have conventional control means for centering (horizontal and vertical), focusing, brightness and video level. Also not shown would be a conventional high voltage power supply. The preferred projector is a magnetically-deflected cathode-ray-tube (CRT) having a phosphor of the desired color and a transmissive optical projection lens. A video amplifier 17 is provided to apply the display image signals to the projectors and to permit adding information to the display useful in adjusting the deflection and convergence circuits.

Typically the three projectors will be mounted in a cluster that constitutes a projector head. The head could be mounted to illuminate the screen from either side (for front or rear projection) and, if desired, can be mounted off axis for either wall or ceiling mounting. When off-axis mounting is employed the resulting keystoned picture can easily be corrected by conventional sweep or deflection tilt signals.

Even if the projector head is mounted on the screen axis, only one of projector trio will actually be on axis. The other two will be slightly keystoned because of parallax. It is preferred that the green projector be the center mounted element, as shown, and the red and blue projectors angled and coverged to conform with the green projector. In operation the green projector 11 is caused to produce a square (or rectangular) raster as desired by adjusting its tilt controls which will be set depending on the angle of the projector with respect to screen 16. Then, using their respective tilt and centering controls, the red projector 10 and blue projector 12 are caused to produce as nearly convergent rasters as possible. The above operation is facilitated by projecting a crosshatch or grid pattern that is developed as will be described below.

While the adjustments described thus far will produce a color display raster that is nearly converged, and can be used to correct for off-axis projection, they will not be adequate for precise convergence. Due to local scanning disturbances that always result from the manufacturing differences that occur between projector units, it is desirable to apply precise convergence correction that will be effective over any selected area of the raster.

Ideally each portion of the raster should be converged without affecting any other area, so that as each area is converged in a sequential manner, one adjustment series is all that is required. The invention to be described below accomplishes this using a built-in digital computer for signal generation and processing along with an analog deflection control system.

The red, green, and blue CRT projectors are supplied with horizontal deflection coils 20, 21, and 22 respectively. These are driven in common from horizontal sweep generator amplifier 23 which provides a linear sawtooth of deflection current of the proper magnitude. Each coil is also connected to its respective red linear amplifier 24, green linear amplifier 25, or blue linear amplifier 26. These three linear amplifiers are fed correction signals from horizontal ramp generator and pincushion corrector 27, and from convergence generator 28. Thus amplifier 23 supplies most of the deflection energy while amplifiers 24, 25, and 26 apply the raster scanning corrections described above.

A more detailed discussion of this deflection system can be found in copending application Ser. No. 509,085 filed Sept. 25, 1974, by Rodney K. Toone.

Vertical deflection coils 30, 31, and 32 are driven in common from vertical sweep generator amplifier 33 while linear amplifiers 34, 35, and 36 apply the correction signals for vertical deflection raster scanning. Vertical ramp generator and tilt corrector 37 provides the required vertical deflection correction signals. It will be noted that vertical and horizontal ramp signals are provided between correctors 27 and 37 so that the required keystone correction is available. Since the pincushion and keystone correction actions are well-known in the prior art they will not be described in further detail here.

The components thus far described will enable the generation of a raster that is keystone and pincushion corrected but will not necessarily be accurately converged over the entire picture area.

Digital convergence computer 28 is fed horizontal and vertical sync and delivers precision convergence correction signals to the blue and red linear amplifiers so that the red and blue rasters are precisely converged onto the green raster. A remote convergence control panel 29 contains all of the operating controls necessary to adjust the convergence signals.

The system to be described divides the raster up into a maximum of 256 areas, 16 horizontal and 16 vertical, each of which can be separately and independently converged. If desired the display can be divided into a different number of regions for example 4, 16, or 64 regions that can be separately and independently converged. Desirably the screen is first divided into 4 regions and each one separately converged for a coarse adjustment. Then the 16 position display set up and converged for a finer adjustment. If this provides adequate overall convergence the process can be stopped. If a finer convergence is called for, the 64 position display is set up and each area separately converged. Finally, for the ultimate precision, the 256 position display can be invoked and each small area separately converged. Using this last or high-precision adjustment it has been found that a 1229 line, 60 frame per second raster could be converged to better than one-eigth picture element over the entire raster using mass-produced circuit components.

Furthermore, while in the system shown, separate keystone and pincushion correction signals were used, the digital correction could be used alone if digital correction wass applied also to the green linear amplifiers. Thus only digital correction can be employed if desired. In this case blocks 27 and 37 would be eliminated and computer 28 would supply signals to amplifiers 25 and 35 in addition to the others.

DETAILED DESCRIPTION OF THE PREFERRED EMBODIMENT

FIG. 3 is a detailed block diagram of blocks 28 and 29 of FIG. 2. All of the controls for the elements of FIG. 3 are located in the convergence control panel 29. This panel is connected remotely by means of a flexible cable 40, the lines of which are labeled to indicate function. The control panel can be removed from the equipment and operated at a distance. This construction permits an operator to perform the actual convergence from a position very close to the display screen and will thereby allow very precise adjustment. Control panel 29 is detailed to show the layout of the various controls.

The heart of the digital computer is a random access memory (RAM) 41. This device is programmed when the display system is converged. Afterward it is used to read out the convergence correction data. Accordingly it is read mostly and must be of the non-volatile nature. That is the data must be retained even though the display is shutdown or the power removed. In the preferred embodiment the 8192 bit capacity was achieved by using four 2048-bit ovonic memory devices. In such a device an amorphous layer of semiconductor, located between two electrodes, can be rendered conductive or non-conductive by a suitable programming pulse. This state is retained until deliberately altered so that the memory function is non-volatile. This memory function can also be achieved using a conventional CMOS memory device available from any one of a number of vendors. Such a memory operates at a very low power level and can be made non-volatile by floating a small battery across the power supply terminals. This latter type of memory may be preferred because its write time is much faster than that of the ovonic memory.

In FIG. 3, the blocks located to the left of RAM 41 provide for controlled addressing and can be manipulated to relate to any one of the 256 raster-related regions. As will be described, coarse addressing can also be confined to multiples of the 256 areas so that the addressing can be confined to ¼, 1/16, and 1/64 screen areas. The blocks to the right of RAM 41 provide for continuous memory read out in synchronism with the raster scanning. This is always based on the 256 areas. Each horizontal scanning line is divided into 16 parts and each part is provided with four individual correction voltages, one each for vertical and horizontal correction for red and blue projectors. Likewise the vertical raster dimension is divided into 16 increments. Thus as the raster is scanned each of the 256 areas will receive its appropriate correction voltages as will be described in detail below.

In order to operate the RAM 41 so that its data is related to the scanning of the display raster, a means of synchronized addressing must be employed. This is related to horizontal scanning as follows. Horizontal address is synchronized by horizontal voltage controlled oscillator 42 which is of the phase locked loop (PLL) variety. It runs at a frequency of about 128 times the horizontal sync frequency. Upon receiving the display sync pulse, oscillator 42 will produce a series of pulses precisely spaced apart. The pulses are applied over line 43 to X counter 44 which is a seven-stage device. After a count of 128, a signal is applied over line 45 to stop oscillator 42 until the next sync pulse is received. The 7 outputs from X counter 44 are applied to X address comparator 46 which is also connected to a similar seven outputs from X up/down counter 47. The word in counter 47 is established as a function of an adjustment on control panel 29.

A three-axis joy stick 50 labeled XY ADDRESS AND DATA is used to manually generate address control signals. This joy stick has three basic motions; it can be moved in the left-right direction to vary the X address and a forward and back motion is used to vary the Y address. The joy stick shaft can be rotated for controlled data entry. In all joy stick functions there is a central neutral position at which no change occurs. In order to change address or data, the joy stick is manipulated off neutral and the departure from neutral sets the rate of change. Thus as the joy stick is deflected towards +X the address moves to the right until the joy stick is returned to neutral. How rapidly the address changes is a function of how far the joy stick is deflected. This concept applies to all three joy stick degrees of freedom.

The joy stick 50 drives a trio of potentiometers (not shown) each of which in turn produces a voltage, the polarity of which is a function of which way joy stick 50 is moved. The magnitude of the voltage is a function of how far the joy stick is moved. Since joy stick 50 is of conventional commercially available design, its operation will be described only as to its function in the following explanation.

The joy stick X direction motion will produce a d-c voltage on line 51 of cable 40. This voltage will be zero when joy stick 50 is at center (or neutral), positive when joy stick 50 is deflected to the right (or +X) and negative when the joy stick 50 is deflected to the left (or −X). Voltage-to-frequency converter 52 will produce a series of output pulses as a function of the applied voltage and these pulses will set counter 47. When the voltage on line 51 is positive, counter 47 is programmed to count up for each pulse from converter 52. When line 51 is negative, counter 47 will count down. The rate of change in count is determined by how far joy stick 50 is deflected from its neutral position. Thus the word in counter 47 is set up by means of joy stick 50 and can be varied at will.

When comparator 46 finds a match between the words in counters 44 and 47 it will generate an output called X comp on line 53 which is connected to cursor generator 76 and decoder 81, both of which are to be described below. The signal on line 53 will be a repetitive function related to the horizontal sync pulse in time as set by joy stick 50.

The outputs of counters 44 and 47 are also applied to X address multiplexer 54 which addresses RAM 41.

A similar arrangement is provided for the vertical deflection direction. Vertical sync from the display is applied to vertical voltage controlled oscillator 55. This oscillator is much like that of oscillator 42 except that it runs at about 128 times the vertical sync frequency. Its output is applied to Y counter 56 which is a 7 stage device that returns a pulse after the 128th count to stop oscillator 55. The seven outputs of Y counter 56 are connected to Y address comparator 57 which also receives a word input from Y up/down counter 58. Counter 58 is set by voltage to frequency converter 59 in the same way that counter 47 was set by converter 52. However converter 59 receives its input voltage from line 60 of cable 40 and this voltage is produced by a potentiometer (not shown) operated by the up-down motion of joy stick 50. Comparator 57 produces an output called Y comp on line 61 when the words in counters 56 and 58 match. Line 61 is also connected to cursor generator 76 and decoder 81 to be described below. Thus the Y comp. output is time related to the vertical sync and can be set as desired by means of +Y and −Y motion of joy stick 50.

The outputs of counters 56 and 58 are also applied to y address multiplexer 62 which addresses RAM 41. When this address is combined with the one from multiplexer 54 it can be seen that any address location of RAM 41 can be selected or addressed by the action of joy stick 50. Simply moving the joy stick in the X and Y directions will permit addressing any four-group, 8-bit word segment of RAM 41. As the joy stick is moved vertically the address is varied with respect to the vertical sync and as the joy stick is moved horizontally the address is moved with respect to the horizontal sync. When the joy stick is at neutral the address will remain unchanged. The rate of change of address will be a function of how far the joy stick is deflected.

RAM 41 is also addressed by two mode control switches 65 and 67 located on panel 29. HORIZ/VERT switch 65 is connected by line 66 to RAM 41, and RED/BLUE switch 67 is connected by line 68 to RAM 41. These switches address RAM 41 to select one of the four 8-bit words associated with the corrections for the red and blue projectors in terms of vertical and horizontal corrections. Since the multiplexers 54 and 62 can operate to select any one of the 256 raster-related areas, RAM 41 is fully and selectively addressed.

The location of the address selected in RAM 41 is indicated on the display system by a combination of grid cursor signals. The outputs of counters 44 and 56 are applied to dual multiplexer 70 which is programmed by grid select switches 71, 72, and 73 by way of plural lines 74 in cable 40. These switches permit selecting displays of 256 rasters areas (16 vertical and 16 horizontal), 64 raster areas (eight vertical and eight horizontal), 16 raster areas (four vertical and four horizontal), four raster areas (two vertical and two horizontal), and a single full raster area. Grid generator 75 receives vertical and horizontal information from dual multiplexer 70 and converts it to video information for application to the display system. This video provides bright horizontal and vertical lines on the raster that indicate where the edges of the controlled areas of the raster occur.

Cursor generator 76, which is turned OFF and ON by switch 77 over line 78, receives information on lines 53 and 61 from X comp and Y comp respectively. These signals actually comprise the last three stages of counters 44 and 56 and are developed at the time of word coincidence in comparators 46 and 57. Thus cursor generator 76 will produce a video signal that constitutes a fine crosshatch of lines that will represent 128 lines on the single raster display. For the 256 area display, where the raster is divided into 16 vertical and 16 horizontal regions, the cursor will appear as a crosshatch of lines that fills the raster area being addressed with seven vertical and seven horizontal white lines. These lines make it easy to see when precise raster convergence has been achieved. The cursor and grid generator signals are mixed in or-gate 77 for application to the video portion of the display. The signals from grid generator 75 and cursor generator 76 are combined in OR circuit 177 for application to the video channel of the projectors.

The information contained in RAM 41 is read out for use by way of multiplexer and latch 80. Decoder 81 operates the multiplexer portion while the latch is operated by a clock signal from line 82 which is the output of the stage of counter 44 which provides a signal at 16 times the horizontal rate. This multiplexing breaks up each raster scanning line into 16 parts. The raster correction signals are thus provided to both horizontal and vertical deflection systems at 1/16 horizontal line intervals. This action occurs regardless of how RAM 41 is addressed.

The outputs of RAM 41 are shown divided into four groups for convenience of illustration. Groups 83 and 84 read out the red horizontal and vertical correction words respectively. Groups 85 and 86 read out the blue horizontal and vertical correction word respectively. The multiplexer at 80 converts the memory output from RAM 41 into its corresponding 8-bit digital word that represents the convergence correction for that raster position. Digital to analog converters 83–86 convert the digital 8-bit words to analog voltages. It will be noted that an 8-bit word represents 256 different levels of voltage. Thus as a raster is scanned, analog voltages appear at the digital to analog converter outputs at a rate of 16 times per horizontal line. These are smoothed by amplifier/integrator units 87–90. The integrators have a time constant that provides a smooth transition between adjacent digital word readouts. If desired the convergence correction signals can be turned off by means of switch 92 operating on switch 91 over line 93 in cable 40.

RAM 41 can be programmed to change the stored 8-bit words. Data is manually generated in response to joy stick 50 on control panel 29. To do this joy stick 50 is made to operate a separate data potentiometer (not shown) by rotation. This potentiometer produces a d-c voltage that is a function of rotation on line 95 of cable 40. This voltage is zero at data neutral and as joy stick 50 is rotated clockwise the voltage rises in a positive direction. Counter clockwise rotation from neutral causes a voltage rise in the negative direction. This voltage is applied to voltage to frequency converter 96 which operates up/down counter 97. Counter 97 is an 8-bit counter programmed to count up when line 95 is positive and to count down when line 95 is negative. Thus joy stick 50, by rotation, can increase or decrease the count out of counter 97 which is an 8-bit correction word that is representative of the words contained in RAM 41.

When decoder 81 is turned on by line 98 in cable 40 (by way of switch 99 on panel 29), the word out of counter 97 is switched into one of converters 83–86 at the time set by the signals on lines 53 and 61, which contitute the position established by the cursor on the display. The particular converter that is actuated is set by the position of switches 65 and 67, which also operate decoder 81 over lines 66 and 68.

Now as joy stick 50 is rotated, the convergence correction signal fed into the display will vary in the region defined by the cursor and in the direction, horizontal or vertical, selected by switch 65 and on the red or blue raster selected by switch 67. When the desired convergence correction is attained for the particular conditions selected, write button 100 can be pushed. Write button 100 by way of line 101, in cable 40, causes RAM 41 to enter the word out of counter 97 into the memory. While the write action is going on, line 102 acts upon multiplexers 54 and 62 to lock their states so that addressing cannot change during writing. Thus any 8-bit word in RAM 41 can be manually set as desired for each of the four convergence correction signals at each of the 256 separate raster locations.

In operation the projection system could be set up as follows. With the convergence switch 92 OFF grid select switches 71–73 are manipulated for a convenient grid display, for example a 16 area display. The color enable switches are set with 104 ON while 103 and 105 are OFF. The green projector controls are adjusted to produce the desired raster shape. Then the red projector switch 103 is turned ON and the controls are adjusted for proper keystone, centering and the like to coincide the red crosshatch as nearly as possible with that of the green. Then switch 105 is turned On and the blue crosshatch conformed as closely as possible to the green and red. After this preliminary setup is completed the raster will be fairly well but not completely converged. Now the precision convergence is started.

Switch 105 is turned OFF leaving the green and red crosshatch patterns visible and switch 67 is turned to RED. The cursor switch 77 and switch 99 are turned ON. Joy stick 50 is manipulated in the X and Y directions to cause the cursor to move to the desired area. It is convenient to start in the upper left hand raster area and proceed with convergence as one would read a printed page, but, if desired, any sequence could be used. Also those areas that do not require any convergence correction change can be ignored. With switch 65 in the HORIZ position, joy stick 50 is rotated until the vertical cursor lines in red most closely match the green lines. When this condition is achieved write button 100 is depressed to program the memory. Then switch 65 is moved to VERTICAL and joy stick 50 rotated until the red horizontal cursor lines converge with the green lines whereupon write button 100 is again depressed to enter the word. Joy stick 50 is then manipulated to move the cursor to the next raster area and the above repeated. This is continued for all areas that require improved convergence correction. Then switch 105 is turned ON switch 67 turned to BLUE and the process is repeated for the blue projector. If the overall convergence is acceptable the procedure can be terminated. If the ultimate in convergence accuracy is desired, switches 71–73 can be manipulated to produce the 256 area display and each of the 256 areas converged for red and blue. horizontal and vertical, as described above.

While the above-described procedure started with a display of 16 raster areas it could have been the elementary four-area display. After converging the 4 areas the display could be switched to a 16-area display and the 16 converged. Then the display could be switched to the 64-area display and each one converged. Then the 256-area display invoked and converged. The system disclosed permits a wide latitude of choice on how to proceed and no really fixed procedure is required. After convergence is achieved switches 71–73 are turned OFF thus removing the grid lines, the cursor switch 77 is turned OFF thus removing the cursor lines and switch 99 is turned OFF thereby removing the data entry capability. If desired switch 92 can be tunred OFF to show the effect of the digital convergence but it is normally left ON.

While the above described embodiment is preferred, other configurations are possible. For example the analog raster correction components shown in blocks 27 and 37 of FIG. 2 can be omitted entirely. When this is done the computer is expanded to include green horizontal and vertical correction signals which are fed into linear amplifiers 25 and 35. In FIG. 3 this would involve adding two more digital to analog converters and two more integrators. The RED-BLUE select function on control panel 29 would be expanded to make it a RED-GREEN-BLUE selection and blocks 80 and 81 would be expanded correspondingly. The RMM 41 would be increased in capability to 12,288 bits. In the set up procedure the green raster would be set up to produce the required raster shape by going through the convergence data entry procedure for the green switch settings. Then the red and blue would be converged to the green as described above. This would be a completely digitally corrected raster system.

In still another alternative embodiment a six projector system was developed to produce a brighter picture. Two projectors were used for each color. The system of FIG. 3 was used but three more projectors and three more linear amplifiers were used. The second green projector was provided with digital convergence so that it could be converged with the first green projector. The control panel had six color enable switches instead of three and the mode switches had positions for the second green and two each additional red and blue horizontal and vertical positions. In FIG. 3 there were a total of 10 each digital to analog converters and integrators. The capabilities of blocks 80 and 81 were expanded accordingly. The RAM 41 for this arrangement had a storage capability of 20,480 bits.

A digital convergence system for multiple-source scanning-type image projectors has been shown along with a preferred embodiment and some alternatives. Clearly a person skilled in the art will see that there are numerous alternatives and equivalents. Accordingly it is intended that my invention be limited only by the following claims.

I claim;
1. In an image display device, said device comprising:
at least first and second separately scanned image projectors for projecting an image on a common area of a viewing screen; each of said image projectors including an image generating beam,
first deflecting means for deflecting said beam along a line,
second deflecting means for deflecting said beam in a direction generally perpendicular to said line to form a raster,
means for intensity modulating said beam to produce an image,
means associated with said deflecting means and said modulating means for each projector for causing each projector to display a luminous grid on said common screen area,
means for controlling the number of lines on said grid,
means for selectively suppressing the generation of said grid,
cursor generating means associated with said deflecting means and said modulating means for selectively presenting on said common screen area an indication representative of a selected region only of said raster,
control means associated with said first deflecting means and said second deflecting means of at least one of said projectors for causing said displayed luminous grids to coincide on said common screen area,
a digital memory,
means associated with said control means and said cursor generating means for storing in said memory digital representations of the correction required to obtain coincidence of said grids for the selected region identified by said cursor generating means,
means for selectively altering the selected region identified by said cursor generating means, means for reading said memory in synchronism with the scannning of said projectors, means for converting the digital information in said memory into an analog signal, and means for altering the deflections produced by said first and second deflecting means of at least one of said projectors in response to said analog signals.

2. The image display device of claim 1 wherein said device comprises three projectors with separate memory sections and separate means for altering the deflections produced by said first and second deflecting means for at least two of said projectors.

3. The image display device of claim 1 wherein the normal deflection signal and said analog signals are separately applied to a common deflection coil of said deflecting means.

* * * * *